United States Patent [19]

Sasaki et al.

[11] Patent Number: 5,175,688
[45] Date of Patent: Dec. 29, 1992

[54] GRAPHIC DISPLAY METHOD OF MACHINING STATE IN NUMERICAL CONTROL GRINDING MACHINE

[75] Inventors: Shunichi Sasaki; Hiroaki Arai, both of Niwa, Japan

[73] Assignee: Kabushiki Kaisha Okuma Tekkosho, Aichi, Japan

[21] Appl. No.: 441,319

[22] Filed: Nov. 27, 1989

[30] Foreign Application Priority Data

Nov. 25, 1988 [JP] Japan .................. 63-297349

[51] Int. Cl.⁵ ................. G06F 15/46; G0FB 19/18
[52] U.S. Cl. ................. 364/474.22; 364/474.06; 364/474.26; 364/474.33
[58] Field of Search ............. 364/474.03, 474.06, 364/474.22, 474.26, 474.33, 474.34, 474.14, 474.24, 188, 189, 522; 51/165.71–165.77; 340/723

[56] References Cited

U.S. PATENT DOCUMENTS

| | | | |
|---|---|---|---|
| 4,603,392 | 7/1986 | Chikamoto et al. | 364/188 |
| 4,648,025 | 3/1987 | Yoneda et al. | 364/474.06 |
| 4,648,028 | 3/1987 | Deklotz et al. | 364/188 |
| 4,714,420 | 12/1987 | Andernach et al. | 340/723 |
| 4,731,607 | 3/1988 | Yoneda et al. | 364/522 |
| 4,734,845 | 3/1988 | Kawamura et al. | 364/474.26 |
| 4,757,461 | 7/1988 | Stohr et al. | 364/518 |
| 4,815,000 | 3/1989 | Yoneda et al. | 364/474.34 |
| 4,873,793 | 10/1989 | Asano et al. | 364/474.06 |
| 4,884,373 | 12/1989 | Suzuki et al. | 364/474.06 |
| 4,902,951 | 2/1990 | Ohta et al. | 364/474.06 |
| 4,956,946 | 9/1990 | Tsujiuchi et al. | 51/165.71 |

FOREIGN PATENT DOCUMENTS

| | | | |
|---|---|---|---|
| 0094804 | 6/1982 | Japan | 364/188 |
| 0231104 | 9/1989 | Japan | 364/474.26 |

Primary Examiner—Jerry Smith
Assistant Examiner—Thomas E. Brown
Attorney, Agent, or Firm—Wenderoth, Lind & Ponack

[57] ABSTRACT

On a display device, one or more machining portions in the entire working surface of a workpiece are displayed as image variations in gradation, hue or tone throughout in a direction normal to the axis of the workpiece, to thus facilitate recognition of the machining state. A graphic display system is combined with a numerical control grinding machine to display images of a workpiece being machined and its working surfaces. The workpiece is displayed on the display device as a projection thereof on a plane parallel to the axis of the workpiece. Machining portions in the entire working surface of the workpiece are displayed in gradation, hue or tone changes, throughout in a direction normal to the axis of the workpiece, in accordance with changes in the cut-away amount.

3 Claims, 7 Drawing Sheets

PRIOR ART

FIG. 3A

PRIOR ART

GRAPHIC DISPLAY METHOD OF MACHINING STATE IN NUMERICAL CONTROL GRINDING MACHINE

BACKGROUND OF THE INVENTION

1. Field of the Invention

The present invention relates to a graphic display method for graphically displaying the machining state of a numerical control grinding machine. More specifically, the present invention relates to such a system that is capable of displaying an image of a workpiece on a display in a manner that the displayed image of the surface being worked is changed in gradation, hue or tone in accordance with the amount of material removed from the workpiece, i.e., the amount cut or abraded away (hereinafter referred to as "cut-away amount).

2. Description of the Prior Art

In general, the function of displaying animated images of path that employs a display such as a CRT and that is combined with a numerical control machine tool which is divided into the following three functions: (1) a function for displaying the shape of a tool which is moved in accordance with a part program concerning the part into which the workpiece is to be machined; (2) a function for displaying the locus of a reference point (usually, the tip) of the tool; and (3) a function for displaying the shape of the workpiece and sequentially deleting portions of the workpiece shape which sequentially overlap with the moving tool.

Figure 1:
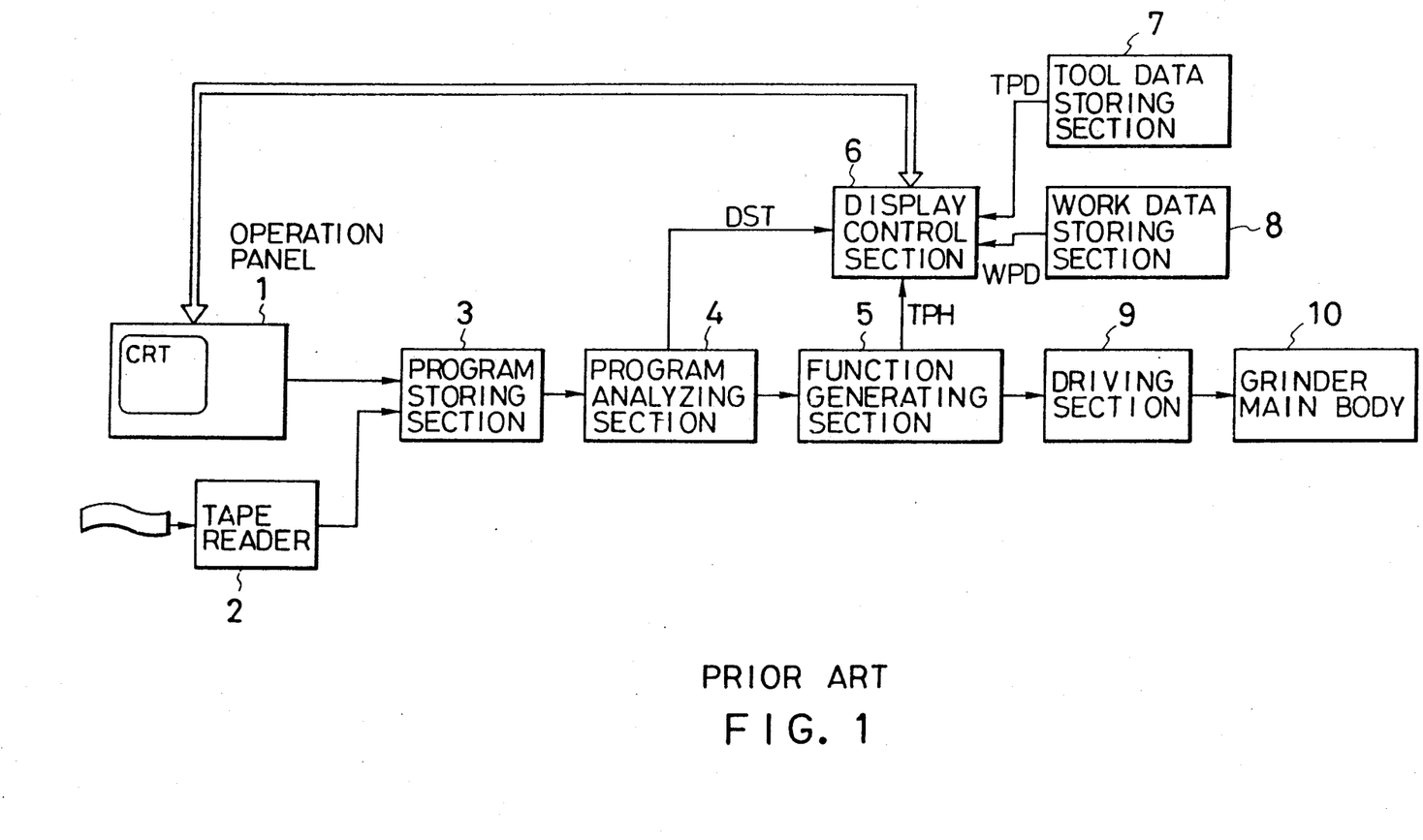
FIG. 1 is a block diagram of a conventional system for graphically displaying the machining state of a numerical control grinding machine.

FIG. 1 is a block diagram showing the arrangement of a conventional system for graphically displaying the machining state of a numerical control grinding machine.

As shown in FIG. 1, the conventional system includes an operation panel 1 having a CRT image display for displaying various configurations and for issuing operational commands, and a tape reader 2 for reading a part program described by, a tape. A program storing section 3 stores a part program read from the operation panel 1 or the tape reader 2. A program analyzing section 4 analyzes the part program stored in the program storing section 3. A function generating section 5 generates a function on the basis of the result of the analysis by the program analyzing section 4. A tool data storing section 7 stores tool profile data (TPD). A work data storing section 8 stores work profile data (WPD). A display control section 6 controls the display of images on the CRT image display on the basis of a describing command (DST) from the program analyzing section 4, an output (TPH) from the function generating section 5, the tool profile data (TPD) from the tool data storing section 7, and the work profile data (WPD) from the work data storing section 8. The system further includes a driving section 9 for driving various shafts on the basis of the output of the function generating section 5. The driving section 9 is connected to a grinder main body 10.

The conventional system operates in the following manner. A part program read from the operation panel 1 or the tape reader 2 is stored in the program storing section 3. When the execution of the program is started, in response to the describing command (DST) from the program analyzing section 4, the display control section 6 clears and initializes the CRT image display of the operation panel 1. The command indicative of the analysis by the program analyzing section 4 is also input to the function generating section 5. Subsequently, the work profile data (WPD) is read from the work data storing section 8 and it is then displayed on the CRT image display. The tool profile data (TPD) is read from the tool data storing section 7 and it is also displayed on the CRT image display with the current position of the grinding wheel serving as a reference. Thereafter, the display control section 6 operates on the basis of the output (TPH) of the function generating section 5 to move the image of the tool displayed on the CRT image display and, simultaneously, to display the path of the tool. The output (TPH) of the function generating section 5 is also received by the driving section 9 which then operates to drive various shafts.

Figure 2A:
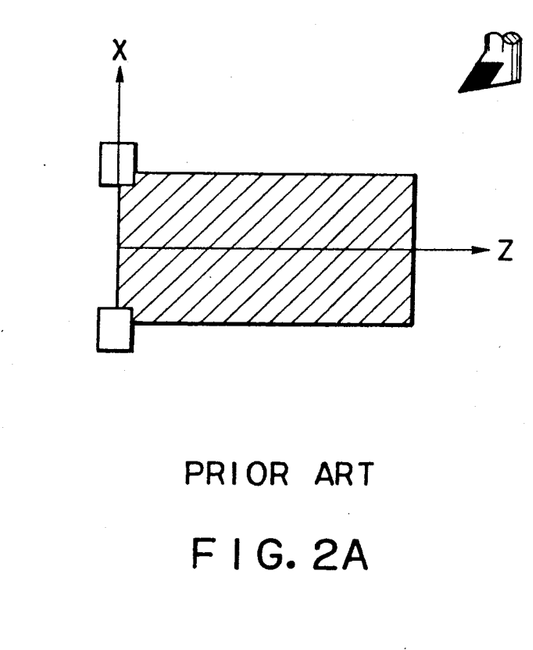
FIGS. 2A to 2C are views showing examples of displays of a workpiece being machined by a numerically controlled lathe combined with the conventional system.
Figure 2B:
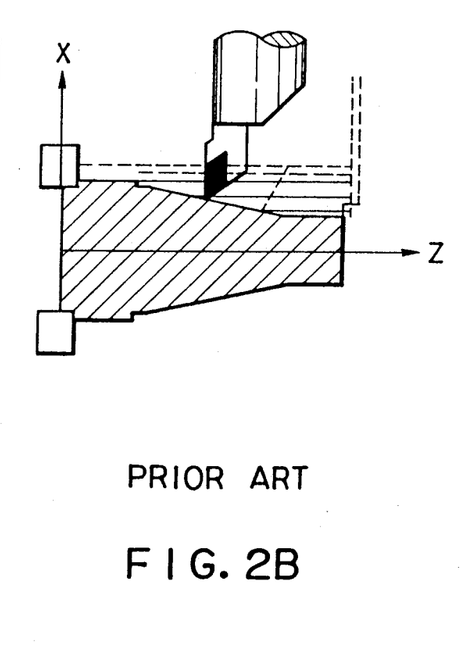
Figure 2C:
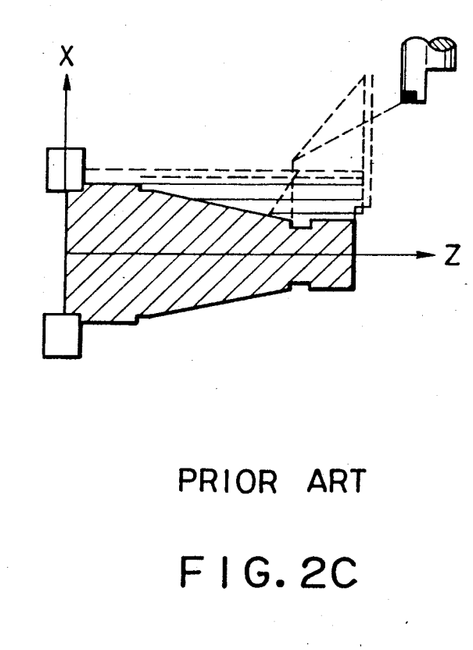

When a conventionally known graphic display method is combined with a numerically controlled lathe in the manner shown in FIGS. 2A to 2C, the method enables machining simulation as well as graphic display during actual machining. Therefore, the method can be used advantageously to check a newly prepared part program, or to monitor the machining conditions during actual machining.

However, the following problems arise in the case where the method is applied to the machining performed by a numerical control grinder. The machining performed by a numerical control grinder greatly differs from the turning machining performed by a lathe, and it has the following features: (1) the configuration, i.e., the profile, of the workpiece is very close to that of the part which is to be finally achieved; and (2) the grinding wheel, serving as the tool, is fed at a low speed and the depth of the cut is very small.

Figure 3A:
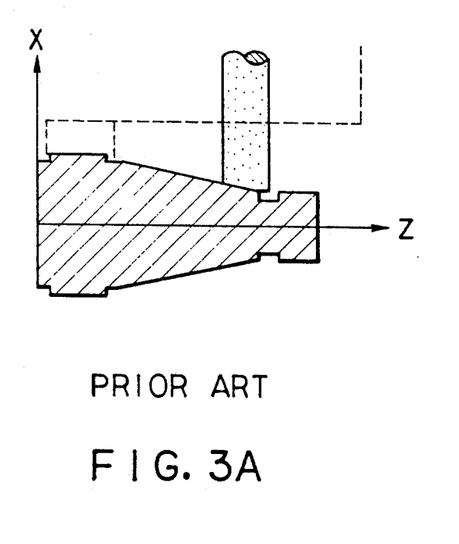
FIGS. 3A and 3B are views showing examples of conventional displays of the machining conditions of a numerical control grinding machine.
Figure 3B:
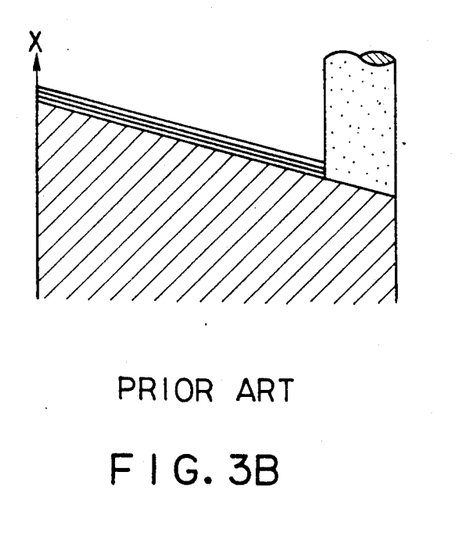

Because of these features (1) and (2), images displayed on a display by the conventional method are such that, for instance, as shown in FIG. 3A, the path resulting from a plurality of cutting cycles virtually overlap with each other due to the small depth of the cuts. This is inconvenient, for instance, for determining the number n of the nth cutting cycle during which the condition displayed is taking place. In order to make this determination, when the image is displayed on an enlarged scale, as shown in FIG. 3B, the entire workpiece cannot be displayed at this time, making it impossible to monitor the overall machining state.

In the case of plunge cutting (not shown), since the cutting speed is low, the grinding wheel, i.e., the tool, remains substantially motionless. Particularly, when a dressing process has been inserted between a rough cutting process and a finishing process, it is impossible to determine, from the displayed path, whether the finishing is completed or not. Thus, when the path animated image display function is combined with a numerical control grinding machine, the function cannot be utilized effectively.

SUMMARY OF THE INVENTION

The present invention has been accomplished in view of the above-described circumstances. It is an object of the present invention to provide a method for graphically displaying the machining state of a numerical control grinding machine that is capable of displaying images of the entire workpiece, and enabling individual machining conditions to be recognized as being clearly distinguished from each other, thereby facilitating checking of a program and monitoring of the machining conditions.

DESCRIPTION OF THE PREFERRED EMBODIMENTS

The preferred embodiments of the present invention will now be described with reference to the drawings.

Figure 4:
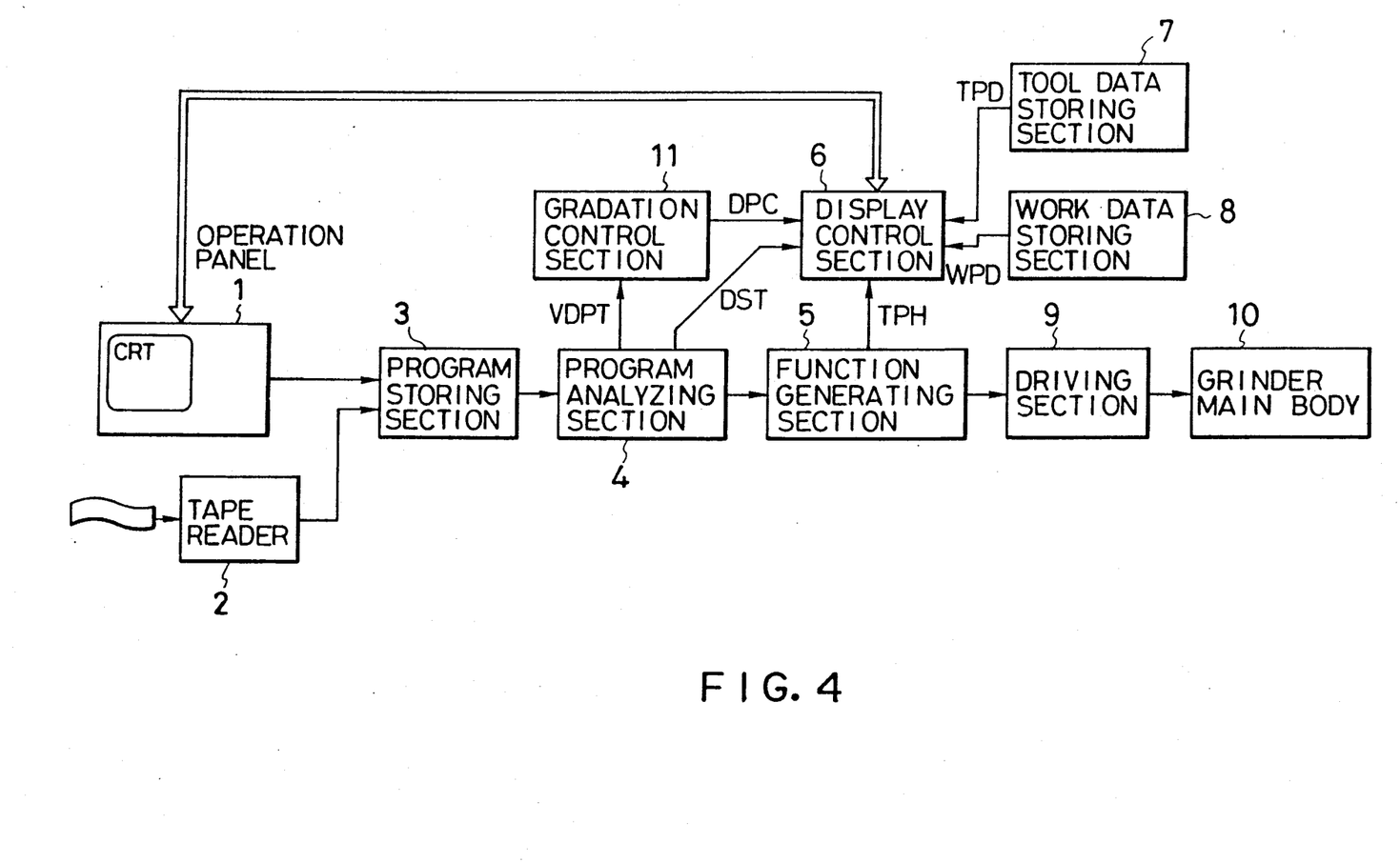
FIG. 4 is a block diagram of a system for graphically displaying the machining state of a numerical control grinding machine according to the present invention.

FIG. 4 is a block diagram of a system for graphically displaying the machining state of a numerical control grinding machine according to the present invention, in which various component parts of the system are shown in correspondence with those in FIG. 1. Detail descriptions will be omitted of the component parts designated by the same reference numerals as those shown in FIG. 1.

The system shown in FIG. 4 is distinguished from the conventional system by the addition of a gradation control section 11 which, as will be described later, receives process commands (VDPT) from the program analyzing section 4 and supplies an output (DPC) to the display control section 6.

Figure 5:
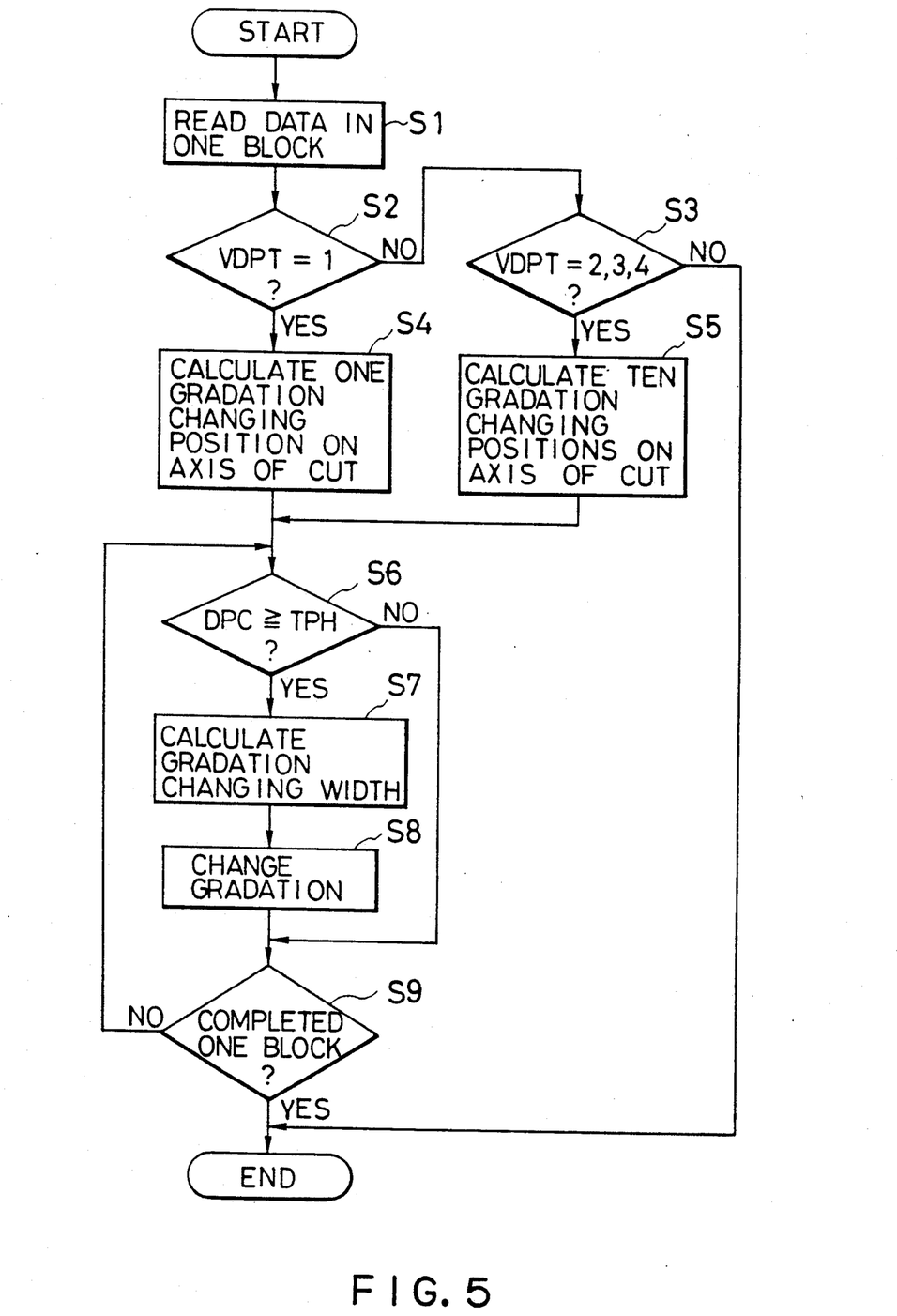
FIG. 5 is a flow chart showing the procedure followed by the method according to the present invention to graphically display the machining state of the numerical control grinding machine.

The system follows the procedure shown as a flow chart in FIG. 5 to graphically display the machining state of a numerical control grinding machine. For instance, during cutting cycles of various types of cutting, images are displayed in gradation, as shown in FIGS. 6A to 6D. During an outer surface machining operation, the proceeding of the machining is graphically displayed, as shown in FIGS. 7A to 7C. During an inner surface machining operation, the system provides graphic displays such as those shown in FIGS. 8A and 8B.

The procedure of the graphic display will now be described by way of a specific example. In this example, all of the cutting processes are divided into four successive stages, namely, an air cutting process, a first rough cutting process, a second rough cutting process and fine cutting process, as shown in Table 1 below, and the number of gradation or gradations to be displayed is predetermined in correspondence with each of the cutting processes. The individual cutting processes which thus fall into four stages cannot be distinguished from each other on the basis of information usually included in a conventional part program. In order to enable this distinguishing, process commands VDPT are newly added to part program so that the program includes commands each specifying one of the values "1" to "4" which specifies one of the processes.

TABLE 1

| Process Name | Process Command | Number of Gradation |
| --- | --- | --- |
| air cutting | VDPT = 1 | 1 |
| first rough cutting | VDPT = 2 | 10 |
| second rough cutting | VDPT = 3 | 10 |
| fine cutting | VDPT = 4 | 10 |

Referring to FIG. 5, when the execution of the part program is started, program data in a first block of the entire part program is read by the tape reader 2 (Step S1). The program analyzing section 4 analyzes the read program data, and makes a determination as to which process is to be entered (Steps S2 and S3). As a result of this determination, if it is determined that the air cutting process is to be entered, i.e., VDPT=1, Step S4 is executed. In the Step S4, a process command VDPT indicative of this determination is received by the gradation control section 11 which then operates to calculate, from the amount of movement along the axis of cut used in the pertinent block, the position on the axis of cut at which the gradation is to be changed (DPC). Since the number of gradation to be displayed is "1" in the air cutting process, the gradation control section 11 calculates one position on the axis of cut (DPC) as the sum expressed as [the cutting start position + the depth of the cut] (Step S4).

On the other hand, if it is determined in the Steps S2 and S3, that the process to be entered is one of the first rough cutting process, the second rough cutting process and the fine cutting process, i.e. VDPT=2, 3 or 4, Step S5 is executed. In the Step S5, the gradation control section 11 receives a process command (VDPT), and operates on the basis of the command. Since, in any of these processes, the number of gradations to be displayed is ten, the gradation control section 11 calculates each of ten positions on the axis of cut (DPC) as [the difference expressed as the cutting start position − the depth of the cut × n/10 (n=an integer between 1 and 10] (Step S5).

When the position on the axis of cut (DPC) has been calculated in the Step S4 or the Step S5 by the gradation control section 11, the display control section 6 receives both the DPC from the gradation control section 11 and an output (TPH) from the function generating section 5, and compares them (Step S6). When as a result of this comparison, the relationship of DPC≧TPH is determined, it is determined that the grinding wheel has come into contact with the position on the axis of cut at which the gradation should be changed. Therefore, in the subsequent Step S7, the width within which the gradation is to be changed is calculated (this calculation will be described later). Subsequently, Step S8 is executed, in which the gradation is changed to a predetermined gradation. On the basis of the result of the decision executed in Step S9, the above-described Steps S6, S7 and S8 are repeated until it is determined that the first block of the part program is completed.

The above-described procedure is followed during the execution of one block of the part program, and it is repeated until all the blocks of the part program are completed.

Next, the calculation of the width within which the gradation is changed in each cutting cycle, as well as the graphic display thereof, will be described by way of specific example.

Figure 6A:
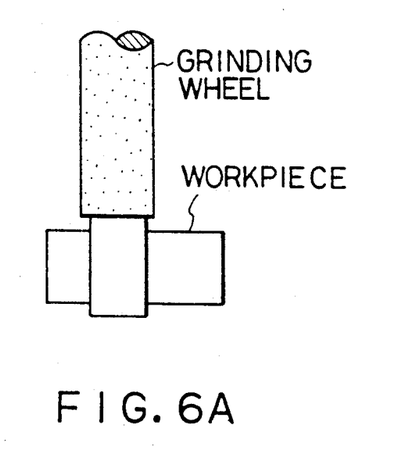
FIGS. 6A to 6D are views showing examples of displays gradated during cutting cycles of various types of cutting.

FIG. 6A shows an example of a display during plunge cutting performed in a plurality of cycles. When it is determined that a grinding wheel, serving as the tool, has come in contact with the workpiece, an effective width of the cut is calculated from both the grinding wheel width among the tool profile data (TPD) stored in the tool data storing section 7, and the width of the portion of the workpiece which is to be cut in the plunge cutting. As cutting by the grinding wheel proceeds, the portion of the workpiece is sequentially cut while being displayed as an image which has, similarly to the hatched portion shown in FIG. 6B, a gradation changing width. During this period, the color in which the portion is displayed gradually changes from an initial color (e.g., blue) representing the initial state of the material to a gradation color (e.g., yellow). Specifically, in the course of cutting, the density of a color (e.g., green) which is the mixture of the initial color and the gradation color changes until it finally becomes the gradation color. At this time, the operator can recognize the completion of the plunge cutting.

Figure 6B:
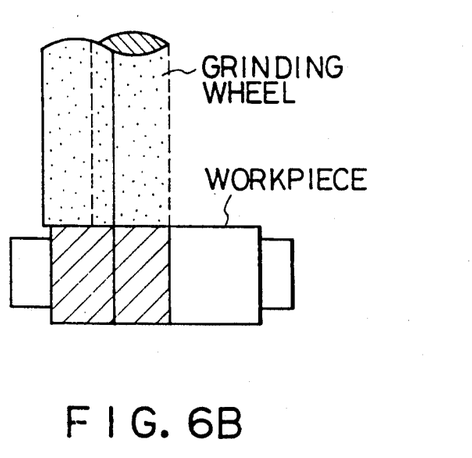
Figure 6C:
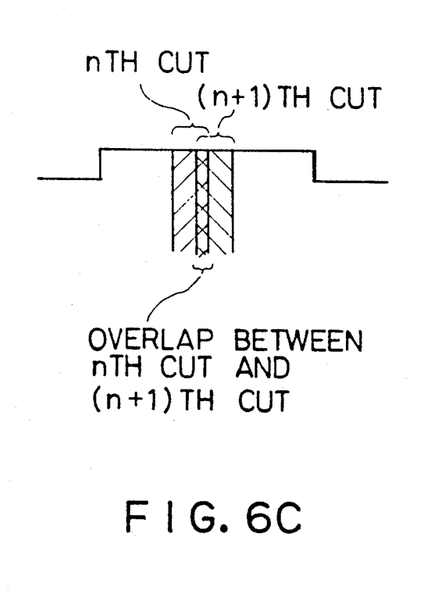
Figure 7A:
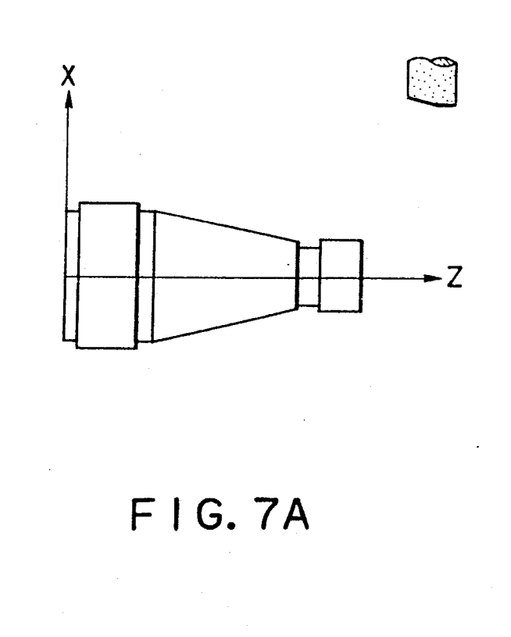
FIGS. 7A to 7C are views showing examples of graphic displays displaying the proceeding of the machining during an outer surface machining operation.
Figure 7B:
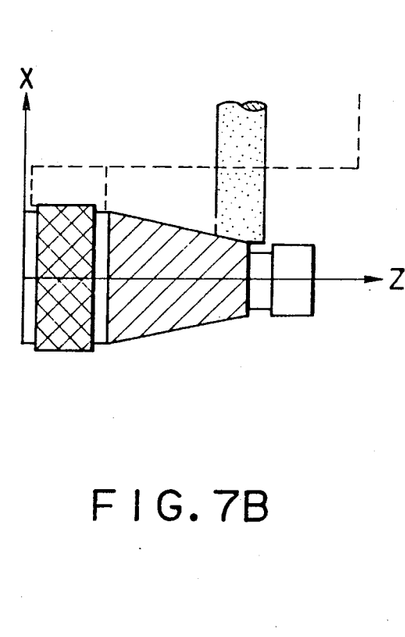
Figure 7C:
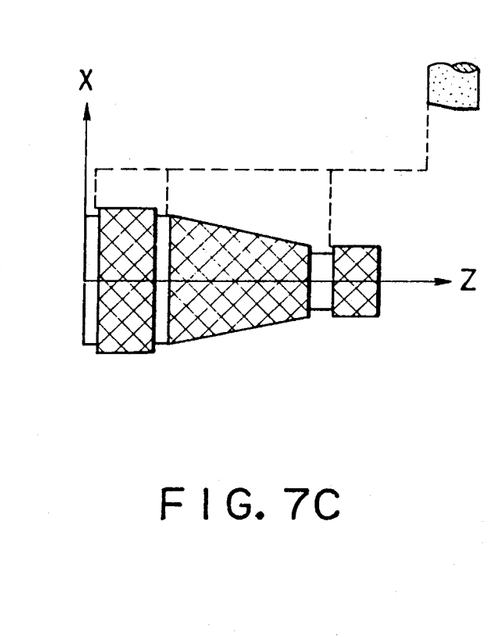

In the case of cutting cycles in multi-plunge cutting such as that shown in FIG. 6B, the grinding wheel performs cutting while it sequentially shifts by a distance within the width of the grinding wheel in the axial direction of the workpiece. During the (n+1)th cutting cycle shown in FIG. 6C, a part of the current or the (n+1)th cut overlaps with the previous or the nth cut. Since this part has previously been subjected to a change in gradation, the width within which the gradation is changed at this time is calculated as the difference expressed as [the grinding wheel width − the overlap width].

Figure 6D:
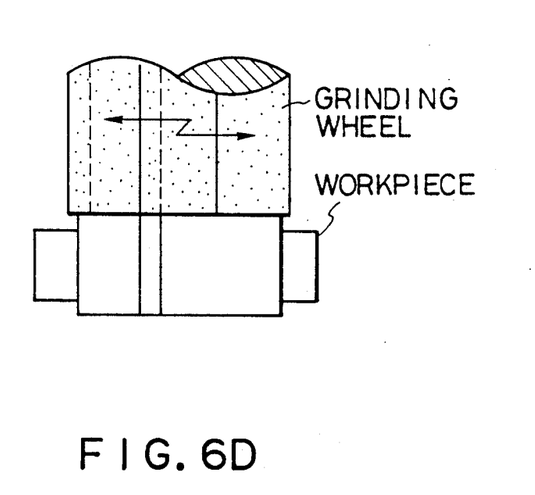

In the case of cutting cycles in traverse cutting such as that shown in FIG. 6D, the grinding wheel performs cutting while it reciprocates within a certain transverse cutting width in the axial direction of the workpiece. In this case, the gradation changing width is calculated in basically the same manner as in that in the case of multi-plunge cutting, and the width is calculated as the width of the unoverlapped part. However, the width varies in accordance with the speed at which the grinding wheel moves axially of the workpiece. Another difference is that, since, in each cutting cycle, the cutting is performed in one of different modes (i.e., continuous cutting mode or one-side cutting mode), the gradation is changed whenever necessary as a result of the comparison between the position on the axis of cut (DPC) and the output (TPH) of the function generating section 5. However, if tapering traverse cutting is being performed, the position of the grinding wheel in the direction of depth of the cut changes with its movement in the axial direction of the workpiece. Therefore, in the case of the tapering traverse cutting, the display control section 6 compares the position on the axis of cut (DPC) with the output (TPH) of the function generating section 5 only at the extremities of the traverse movement. Also, within one traverse movement of the grinding wheel, the displayed color of the workpiece remains at the same gradation (i.e., density).

Accordingly, if a workpiece has a plurality of machining portions, they are displayed on the CRT image display as being in different colors in accordance with their being before, during and after their respective cutting operations, as shown in FIGS. 7A to 7C. Therefore, it is possible to graphically recognize the machining state even if a workpiece has to be machined in a plurality of cutting stages. Further, even if one machining portion has to be subjected to a plurality of cutting cycles in different stages, for instance, if it is necessary to effect multi-plunge cutting cycles in the first rough cutting process, traverse cutting cycles in the finishing process, and another process between these two processes, these requirements can be advantageously met in the following manner. The above-described process command VDPT is utilized in such a manner that VDPT=2 is stated in the beginning of the block for the multi-plunge cutting cycles, which VDPT=4 is stated in the beginning of the block for the traverse cutting cycles. This enables the color of the workpiece displayed on the CRT image display to completely change to a gradation color only after the completion of the traverse cutting cycles. Therefore, the completion of the rough cutting process cannot be erroneously regarded as the completion of the entire cutting.

In the foregoing embodiment, the system includes a CRT capable for color graphic display, and the proceeding of the machining is displayed as a combination of an initial color and a gradation color. However, the CRT may be a device capable for monochromatic graphic display. In this case, since the work profile is displayed as a projection surrounded by border lines, the initial state of the material is represented as an image having a drawn border surrounding an undrawn area.

Figure 8A:
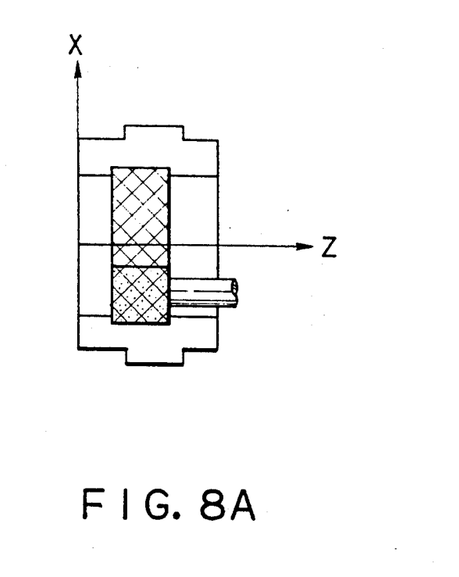
FIGS. 8A and 8B are views showing examples of graphic displays during an inner surface machining operation.
Figure 8B:
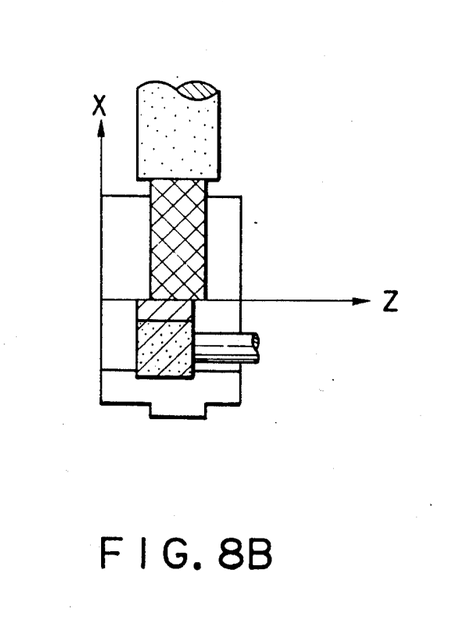

The descriptions given above concern examples of cylindrical outer surface machining. However, similar advantageous effects can be provided in the case of inner surface machining as well. FIG. 8A shows an example of a displayed image in such cases. In this example, the image is a section through the workpiece displayed in the form of a projection thereof. If the system is combined with a numerical control grinding machine capable of both outer surface machining and inner surface machining, the image display may switchingly display different images in accordance with the type of machining. Alternatively, as shown in FIG. 8B, the image display may be divided along the center line of the workpiece into two, or upper and lower, parts so that both the outer surface and the inner surface are simultaneously displayed.

As has been described above, the system for graphically displaying the machining state of a numerically controlled grinder displays, on an image display, images of a workpiece being subjected to the machining. A working surface of the workpiece is displayed in a gradation, hue or tone which changes corresponding the cut-away amount. Therefore, it is possible to easily recognize the machining state in spite of small changes in the cut-away amount, thereby facilitating checking of the programs and monitoring of the machining state.

What is claimed is:

1. A method for graphically displaying a machining state in a numerical control grinding machine which effects both inner surface grinding and outer surface grinding and which includes a display device having an image display for displaying images of a cylindrical workpiece being subjected to machining as well as working surfaces thereof, said method comprising displaying an image of the workpiece on the image display as a projection thereof on a plane parallel to an axis of the workpiece, and changing at least one of a gradation, hue and tone of each machining portion of the image of the workpiece throughout in a direction normal to the axis of the workpiece in accordance with changes in a grinding state of each machining portion, storing a plurality of different display gradations, display hues or display tones, and dividing a total grinding amount in a plurality of grinding cycles into parts displayed in a plurality of different display gradations, display hues or display tones, the displayed gradation, hue or tone being changed in accordance with changes in the grinding state, and when the workpiece is being subjected to inner surface machining by the numerical control grinding machine, displaying the workpiece and the working surface thereof as a projection of a section through the workpiece which includes the axis of the workpiece projected on a plane parallel to said section.

2. A method according to claim 1, wherein the numerical control grinding machine is capable of both inner surface machining and outer surface machining, further comprising switching images displayed on the image display in accordance with type of machining.

3. A method according to claim 1, wherein the numerical control grinding machining is capable of both inner surface machining and outer surface machining, further comprising displaying images on the image display which are divided, along a center line of the workpiece, into two vertically arranged parts such that both the outer and inner surfaces of the workpiece are simultaneously displayed.

* * * * *